United States Patent Office 3,383,657
Patented May 14, 1968

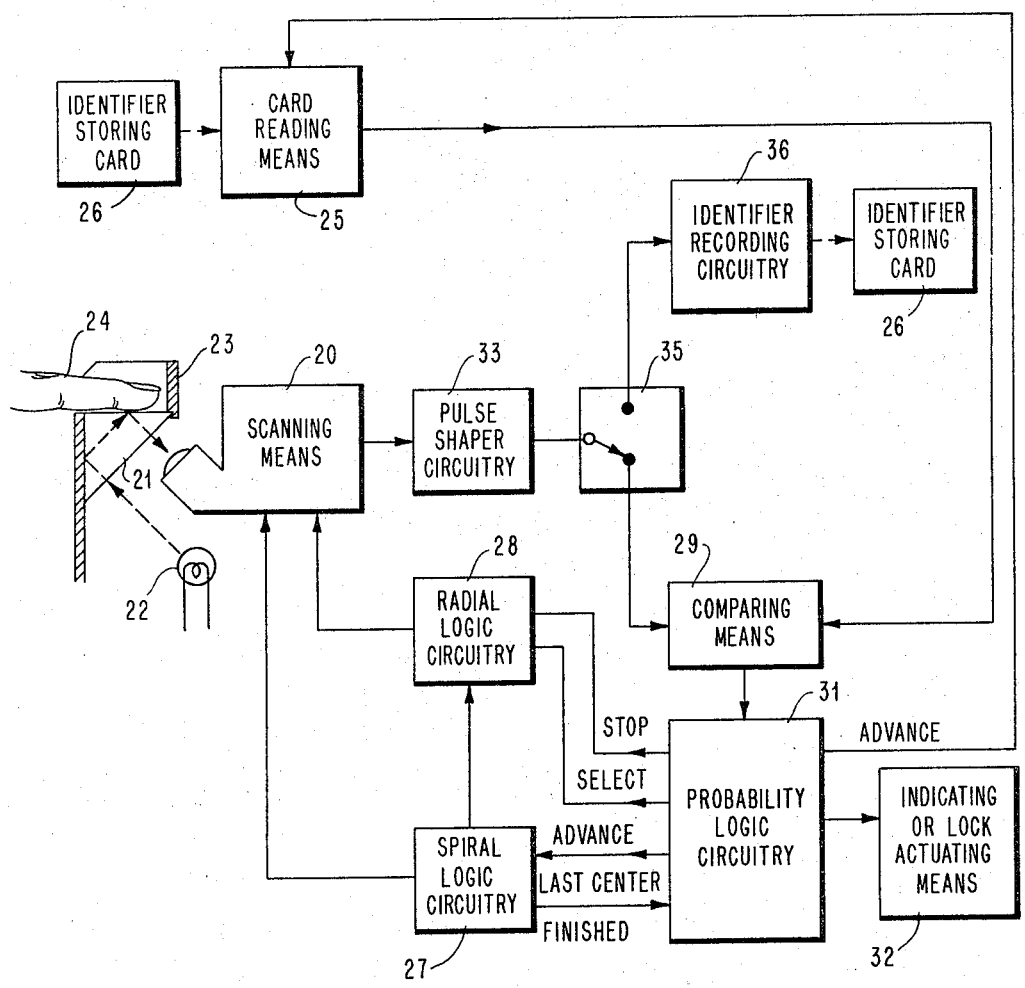

3,383,657
PERSONNEL SECURITY SYSTEM HAVING PERSONALLY CARRIED CARD WITH FINGERPRINT IDENTIFICATION
Claus Helmut Claassen, Fremont, and Louis Dell Green, San Jose, Calif., assignors to International Business Machines Corporation, Armonk, N.Y., a corporation of New York
Filed May 28, 1965, Ser. No. 459,694
6 Claims. (Cl. 340—149)

ABSTRACT OF THE DISCLOSURE

A given person is identified by the print of a predetermined one of his fingertips. The identification is made by comparing identifiers generated by scanning the fingertip optically with indentifiers previously generated by scanning that fingertip in the same manner and recording the resulting identifiers on a portable personnel identification card personal to the given person and carried by him. Indicating means or lock actuating means are operated in response to a favorable comparison of the identifier on the card and the identifier generated by scanning the actual fingertip. The system is operable independently of a central file of identifiers and the given person is free to approach any identifying station in the system.

---

The invention relates to personnel security systems, and it particularly pertains to a pass card system for controlling entrance to an exit from a restricted area to be protected.

In general, the problem of ascertaining the identity of an individual is one of the most common faced in the every day affairs of commerce, industry and government. It is highly desirable to have automatic means for identifying human beings. A tremendous number of individuals are check by cumbersome methods every day in libraries, banks, factories, other classified areas, and by law enforcement agencies. Since fingerprints are unique to the person, it is highly desirable that the automatic means be based on the recognition of fingerprints. It should be mentioned that there are times, too, when the lower animals are identified by their pad prints. However, the problem solved by the invention is not likely to encompass the identification of the lower animals, at least for some time to come, but it should be understood that if it were desirable, the lower animals could also be identified by the arrangement according to the invention.

Presently employed means of identification are crude, time consuming, or both. For example, guards often must check credentials or badges at gates or at entrances to restricted areas. Forgery of credenials and the like is too often effective for gaining improper ends.

A system for automatically identifying a human being by means of his fingerprints is shown and described in the copending U.S. patent application Ser. No. 376,125 of David A. Bourne, filed June 18, 1964, issued as U.S. Patent 3,292,149 on Dec. 13, 1966 for "Contour Pattern Indentification and Comparison Apparatus." In that arrangement, the tip of a given finger of a challenged person is scanned by contour pattern identifying apparatus and a train of electric pulses is produced correlative to the scanning path. This pulse train is compared with another train of electric pulses representing indicia stored in an electromagnetic binary digit data storing apparatus which is addressed by means of an identification card carried by the challenged person and containing indicia corresponding to the address of the identifying indicia of that person in the data storing apparatus. If the two electric pulse trains compare favorably, the output circuitry of the comparator functions to admit that person; and if the comparison is unfavorable, the output circuit of the comparator functions to deny access.

This prior art arrangement is unquestionably very effective; however, it requires a large data store and in this case of multiple installations, it requires either a multiple of data stores or interconnections between the challenging stations of each installation and a central common data store. Furthermore, it also requires updating as frequently as personnel are added or deleted from the roster. Frequently, the updating takes time so that temporary measures must be employed to admit newly added personnel and to guarantee denial of admission to newly severed personnel.

Accordingly, an object of the invention is to provide automatic means for comparing the fingerprints of an individual whereby a rapid and highly fraud proof check may be made, particularly at entrances to restricted areas, independent of any large data storage arrangement, so as to introduce speed and economy into the identification process.

Another object of the invention is to make the identifying data immediately available for immediate entry of a new employee into the assigned and restricted area.

These and other objects are attained according to the invention in apparatus comprising means for representing the identity of a given person, including means for scanning a predetermined fingertip of that person, means coupled to the scanning means for generating an identifier, or identifiers, in the form of a train of electric pulses, for example, and means selectively coupled to the generating means for storing the identifiers in a personal record medium such as an identification card to be carried by that person or a time clock card; and means for identifying that person including means reading the personal record medium, means rescanning the predetermined fingertip for regenerating the identifier(s), means coupled to the reading means and rescanning means for comparing the recorded iden ifier(s) with the regenerated identifier(s), and means coupled to the comparing means for indicating the comparison.

In order that the practical aspects of the invention be readily realized, an embodiment thereof, given by way of example only, is described hereinafter with reference to the accompanying drawing forming a part of the specification and in which:

The sole figure is a functional diagram of apparatus operating according to the invention.

Details of the apparatus which are not a part of the invention in and of themselves are known to those skilled in the arts of scanning and pulse generating. An example of apparatus including these details is found in the above identified copending patent application Ser. No. 376,125 which is hereby incorporated as a reference.

Briefly, the invention comprises fingerprint pattern identification apparatus for determining whether a challenged ridge pattern submitted thereto is known, comprising scanning means adapted to scan a challenged pattern of fingerprint ridges and produce a train of electric pulses correlative to the scanning path; a personal identification (or a time clock) card for storing identifiers correlative to that pattern of fingertip ridge lines; reference coordinate determination means for searching the challenged fingerprint ridges for known reference coordinates, comprising means for controlling the scanning means in a predetermined sequence of scans constituting a fixed number of possible orientations of the known reference coordinate on the pattern of contour lines; pattern identification means responding to location of a reference coordinate by the reference coordinate determination means by controlling the scanning means in a series of scans having a known spatial relation to the reference coordinate; and means for comparing any train of pulses produced by the scanning means with the identifiers stored in the personal card storing means for correspondence.

Referring to the drawing, apparatus according to the invention broadly comprises known electronic scanning means 20 and an optical viewer shown as a prism 21 illuminated by a light source shown as a single lamp 22 mounted in a reference frame 23 in which a predetermined finger 24 is placed for scanning the print on the tip and producing a series of identifiers unique to that print. A known reader 25 is arranged to read an identity card 26 assigned to the person having the finger 24 and having the identifier thereof recorded therein. The identity card storing means 26 may be in the form of an identification card or a time clock record or other record as desired. Preferably, according to the invention, the identifiers of the finger 24 are recorded in the card 26 by means of magnetic record media of known form; however, other recording methods may be used such as, for example, the common Hollerith punched card.

Aligning the finger 24 and the scanning means 20 during an attempted recognition of a fingerprint is important. The above mentioned copending U.S. patent application Ser. No. 376,125 describes one means for effecting alignment by employing a scanning means 20 which is directed in the preliminary identification phase by spiral logic 27 and radial logic 28, together constituting reference coordinate determination means which serves to effectively align the finger 24 with the record in the storage means or identity card 26.

The output of the card reader 25 is applied to a comparing circuit 29 which is connected to a probability logic circuit 31 for controlling the radial and spiral logic circuitry. The output of the probability logic circuit 31 is applied to a gate lock actuating means or indicating means 32 for indicating the result of the comparing operation. A pulse shaper 33 is preferably introduced in the circuit after the scanning means 20 for shaping the output pulses from the scanning means 20 into a more regular and uniform pulse of the same spacing and periods. In many instances it will be possible to omit the pulse shaper 33. In order that the comparison between the identifiers recorded on the card 26 and those produced by the scanning operation at the time the person to be identified is challenged, the same apparatus is used to generate the identifiers recorded on the card. This is accomplished by using a selector 35 for switching the output of the pulse shaper 33 to recording apparatus 36 for recording the identifiers on the card 26 at the time the person to be identified is first added to the roster of people to be admitted to the restricted area. As set forth in the aforementioned copending application, the scanning logic circuitry described therein is but an example of scanning logic which may be applied by those skilled in the art. The radial pattern described, however, is preferred. While it is convenient and somewhat advantageous to use the same equipment train from positioning means 23 to the scanning means 20 and to the pulse shaper 33 and both the identifiers generating and recording and reading operations or comparing operations, it is by no means necessary. Similar equipment designed to produce a record of the fingertip that will match the scan of the finger 24 will suffice in the record making stage and the record may be transmitted to the storage means 26 electronically or transported there physically.

The identity means 26 may be, for example, the wallet identification card of an employee at his place of employment, or his badge or his time record card. Alternatively, the challenged individual might state his identity to a guard in whose possession the identity card or other record card 26 might rest.

In the practice of identifying personnel with the apparatus described hereinbefore, it should be noted that when a new employee is added to the roster, he may be taken to the apparatus, the selector switch 35 thrown to the position for recording the identifiers which will be supplied by his fingertip and the record made on his identification card 26 in a matter of seconds. The time for making this record is so short that in practice it is entirely feasible for the new employee to have his record made as he stands in line with the other personnel being admitted to the area; however, new personnel usually are taken in during the intermediate portions of the working day so that this feature is of less practical consequence than it might be.

When an employee is to be deleted from the roster and for some reason he has been able to retain his identity card, he might be continued to be admitted to the restricted area until a guard can recognize him visually and take up his identity card. This is readily made automatic by employing a small storage means to record the identifiers of recently deleted personnel and interposing another comparison device and this storage means in this circuit to prevent the operation of gate lock 32 in the event that the fingertip is identified by the identifier on an identity card 26 and also on the list of personnel recently deleted. In this way only a small storage arrangement is needed and the advantage of the invention whereby storage means for recording all of the personnel to be admitted into an area or areas is obviated according to the invention. Better still, the identity card 26 has magnetic recording means for recording a daily validator character which is changed from day to day in the guard station apparatus so that only those personnel who report times and check out at the proper times will have the necessary validator for the day as described and disclosed in U.S. Patent 3,154,761, issued on Oct. 27, 1964 to William F. O'Gorman. In this manner the likelihood of an undesirable person entering the area is greatly lessened.

Further, according to the invention, it may be found that the identifiers of a particular person may be located on a particular portion of his fingertip. In that case, the information on the identity card 26 may also contain characters indicating which portion of the print of the identifiers are found and the scanning means 20 is confined to that area in generating identifiers for comparison with the identifier on the identity card 26.

Thus, with the invention needed entry is available to new employees without the necessity of special access to any storage record of identifiers and the need for expanding storage apparatus with the increase of personnel assigned to the particular area is obviated.

While the invention has been particularly shown and described with reference to a preferred embodiment, it will be understood that those skilled in the art will make changes in form and details without departing from the spirit and scope of the invention as defined in the appended claims.

The invention claimed is:

1. Apparatus for identifying a given person, comprising:
portable personnel record means personal to said given person,
means for scanning a predetermined fingertip of said given person,
means coupled to said scanning means for generating an identifier,
means selectively coupled to said generating means for storing said identifier in said portable personal record means,
means for reading said identifier recorded in said record means,
means for comparing identifiers,
means for coupling said reading means and for selectively coupling said generating means to said comparing means for comparing the identifier generated upon rescanning said predetermined fingertip with the identifier stored in said record means, and means coupled to said comparing means for indicating the comparison.

2. Apparatus for identifying a given person as defined in claim 1 and wherein:
said record means is constituted by a part of an identification card carried by said given person.

3. Apparatus for identifying a given person, and wherein:
said record means is constituted by a part of a time clock record card assigned to said given person.

4. Apparatus for identifying a given person, comprising:
personal portable record means personal to said given person,
means for determining the identity of said given person, including:
means for scanning a predetermined fingertip of said given person,
means coupled to said scanning means for generating an identifier, and
means selectively coupled to said generating means for storing said identifier in said personal portable record means, and
means for identifying said person, including:
means for reading said record means,
means coupled to said reading means and selectively coupled to said scanning means for comparing the identifier generated upon rescanning said predetermined fingertip with the identifier stored in said record means, and
means coupled to said comparing means for indicating the comparison.

5. Apparatus for identifying a given person, comprising:
a personal portable identifier storing card assigned to said given person,
an identification station having:
card reading means,
optical fingerprint projecting means,
electronic fingerprint scanning means,
fingerprint identifier generating circuitry,
identifier recording circuitry selectively coupled to said scanning means for storing identifiers in said storing card,
comparing means coupled to said card reading means and selectively coupled to said scanning means,
electronic logic circuitry connected between said comparing means and said scanning means for controlling the scanning, and
indicating means coupled to said comparing means.

6. Apparatus for identifying a given person, comprising:
a portable personnel record personal to said given person and carried by him,
means for scanning a predetermined fingertip of said given person,
means coupled to said scanning means for generating an identifier,
said personnel record having said identifier stored therein,
means for reading said identifier as stored in said personnel record,
means coupled to said generating means and to said reading means for comparing said identifiers, and
means coupled to said comparing means for acting on comparison of said identifiers.

References Cited

UNITED STATES PATENTS 3,202,761 8/1965 Bibbero _____ 340—149 X
3,231,861 1/1966 French _____ 340—149

JOHN W. CALDWELL, *Primary Examiner.*

THOMAS B. HABECKER, *Examiner.*

H. I. PITTS, *Assistant Examiner.*